United States Patent [19]
Kapitza

[11] Patent Number: 5,896,224
[45] Date of Patent: Apr. 20, 1999

[54] CONFOCAL MICROSCOPE WITH A DIAPHRAGM DISC HAVING MANY TRANSPARENT REGIONS

[75] Inventor: Hans-G. Kapitza, Oberkochen, Germany

[73] Assignee: Carl-Zeiss-Stiftung, Germany

[21] Appl. No.: 08/521,228

[22] Filed: Aug. 30, 1995

[30] Foreign Application Priority Data

Aug. 30, 1994 [DE] Germany ............... 44 30 735
Aug. 30, 1994 [DE] Germany ............... 44 30 734

[51] Int. Cl.[6] ................................. G02B 21/06
[52] U.S. Cl. .................... 359/389; 359/368; 359/385
[58] Field of Search ........................ 359/368–390, 359/227, 234–236

[56] References Cited

U.S. PATENT DOCUMENTS

| | | | |
|---|---|---|---|
| 3,458,244 | 7/1969 | Klein | 359/380 |
| 4,806,004 | 2/1989 | Wayland | 359/389 |
| 4,884,880 | 12/1989 | Lichtman et al. | 359/227 |
| 5,161,052 | 11/1992 | Hill | 359/377 |
| 5,162,941 | 11/1992 | Favro et al. | 359/368 |
| 5,307,203 | 4/1994 | Hill | 359/368 |

FOREIGN PATENT DOCUMENTS

| | | | |
|---|---|---|---|
| 2316386 | 10/1974 | Germany | 359/388 |
| 3938412 | 5/1991 | Germany | 359/368 |
| 5-45591 | 2/1993 | Japan | 359/368 |
| 1164241 | 9/1969 | United Kingdom | 359/389 |

*Primary Examiner*—Thong Nguyen

[57] ABSTRACT

The invention relates to a confocal microscope with a perforated disc arranged in an intermediate plane (perforated disc microscope). A confocal diaphragm is arranged in an intermediate tube which is to be installed on a conventional microscope between the microscope stand and the eyepiece tube. In addition to the movable diaphragm disc, the intermediate tube has an illumination system for confocal microscopy. The reflection of the additional illumination preferably takes place at a dichroic beam splitter. The intermediate tube is thus particularly suitable for confocal fluorescence microscopy. The entering and leaving beam paths of the intermediate tube are telecentric, so that the intermediate tube can also be used in microscopes with objects corrected to infinity focal intercept. The fluorescence wavelength can be varied by means of different dichroic beam splitters in a reflector turret.

23 Claims, 6 Drawing Sheets

CONFOCAL MICROSCOPE WITH A DIAPHRAGM DISC HAVING MANY TRANSPARENT REGIONS

BACKGROUND OF THE INVENTION

Confocal microscopes with a diaphragm disc having many transparent regions—so-called perforated disc microscopes—are known, for example, from U.S. Pat. No. 3,926,500 and U.S. Pat. No. 4,927,254. Seen in the direction of illumination, the diaphragm disc is imaged in the focal plane of the objective on the object side, so that the object is illuminated by a pattern of points of light. The light coming from the object plane which is conjugate to the diaphragm plane is transmitted, nearly unattenuated, by the diaphragm disc, and the light coming from other object planes is strongly attenuated by the diaphragm disc. The transparent regions on the diaphragm disc are arranged so that when the diaphragm disc moves, each image point of the intermediate image coincides at a sufficiently high frequency with a transparent region. The image field is thereby scanned at a high frequency, so that a confocal image can be visually observed in the eyepiece of the microscope.

The diaphragm disc is constructed as a rotating disc in U.S. Pat. No. 3,926,500 and U.S. Pat. No. 4,927,254. The diaphragm disc must here have at least twice the diameter of the image field in the intermediate image plane, the transparent regions being arranged on a circular ring whose width corresponds at least to the image field diameter. In this so-called "modified Nipkow disc", the number of the transparent regions is therefore very large, though at any given time only about 10–15% of these transparent regions are in use. Furthermore, the diaphragm disc, due to its relatively large mass and the required high speed of rotation, must be very well balanced so that no disturbing howling occurs and no vibrations are transmitted to the microscope. Furthermore, the relatively large dimensions of the diaphragm disc make its integration into compact systems difficult.

According to U.S. Pat. No. 4,806,004, this problem was avoided by moving the diaphragm disc with the transmitting regions linearly. This can result, for example, from the transparent regions being arranged on the diaphragm disc at the corner points of a square grid and the diaphragm disc being moved at an angle which deviates from 0 degrees to 90 degrees from the grid directions, with an amplitude which varies with time in a triangular form. In this solution, the diaphragm disc needs to be only slightly larger than the diameter of the image field. Thus, more compact constructions are possible than with a rotating disc. Moreover, both the number of the transparent openings and also the mass of the disc are reduced. However, in order to prevent the transmission of the vibrations of the diaphragm disc to the microscope stand, care must be taken that the frequency of movement of the diaphragm disc does not coincide with a resonance frequency of the microscope stand.

All the solutions known heretofore have in common that the movement of the diaphragm disc always takes place along a geometrically defined, and thus deterministic, path. As a result of this even small deviations of the positions of the transparent regions on the diaphragm disc from the ideal, computed positional geometry leads to visible stripes in the image. The observer's unavoidable blinking of the eye moreover leads to a transitory visible effect which allows a scan pattern "like a flash bulb" to appear and is very irritating. For these reasons, the solutions heretofore for the visual observation of the confocal image are of only limited suitability. Moreover, with such known equipment an unpleasant visual impression arises, possibly resulting from the micro-movements of the eye together with the scanning motion of the diaphragm disc.

Furthermore, by means of intermediate tubes which are known from U.S. Pat. No. 4,884,880 and U.S. Pat. 4,884,881, the visual observation of a confocal microscopic image is possible with an already existing conventional microscope. For this purpose, U.S. Pat. No. 4,884,880 and U.S. Pat. No. 4,884,881 propose to seat an intermediate tube containing a movable diaphragm disc at the interface provided on the microscope stand for the revolving nosepiece. However, such a solution is not possible on most conventional microscopes, since the free space between the seat for the revolving nosepiece and the microscope stage is limited by the structure of the focusing drive to about 25–50 mm, so that a smaller focusing path remains with the intermediate tube installed. This holds true all the more because the beam path in the intermediate tube described there is guided in two planes which are perpendicular to the optical axis of the microscope.

Furthermore, an intermediate tube for microscopes is known from DE-A-2,428,807 (German Laid-Open Patent), and can be inserted between the eyepiece tube and the portion of the stand which carries the revolving nosepiece. This intermediate tube makes possible a rapid changeover between orthoscopic and conoscopic observation. However, the visual observation of a confocal microscope image is not possible with this intermediate tube.

Accessory devices for confocal microscopy are moreover known from U.S. Pat. No. 5,032,720 and U.S. Pat. No. 5,127,730. In them a laser beam is reflected into, and out again from, the photo tube of a conventional microscope. Apart from the fact that very high and unstable structures result from this, it is also the case with these accessory devices that direct visual observation of the confocal image via an eyepiece tube is not possible.

SUMMARY OF THE DESCRIPTION

The invention theretofore has as its object to provide a confocal microscope having a diaphragm disc, in which the visual image impression is improved, and also the appearance of scanning patterns when the observer blinks is reduced. A further object of the invention is to provide an accessory device for conventional microscopes which makes possible a direct visual observation of a confocal microscope image and which gives rise to no additional limitations as regards the free space between the revolving nosepiece of the microscope and the microscope stage.

To produce the relative motion, electromechanical transducers driven by low frequency noise signal generators can be provided. The noise signal generators then produce electrical signals of different amplitudes in the frequency region from 0 Hz up to a MHz. The noise signal generators can however also be conventional short wave and ultra short wave receivers, known from radio technology, with associated amplifiers, to produce a frequency modulated noise signal in the acoustic frequency region (20 Hz–20 kHz). The electromechanical transducers can be constructed as electromagnets, for example from headphone loudspeakers, or as piezo converters, or the like.

The frequency regions and the bandwidth of the noise are to be selected such that the diaphragm disc can follow the noise sufficiently rapidly and that the noise has a bandwidth which is sufficiently wide to ensure that no clearly preferred frequency of the diaphragm motion occurs.

DESCRIPTION OF THE DRAWINGS

Details of the invention are described in more detail herein below, with reference to the embodiments shown in the Figures. In detail.

DETAILED DESCRIPTION OF PREFERRED EMBODIMENTS

Figure 1:
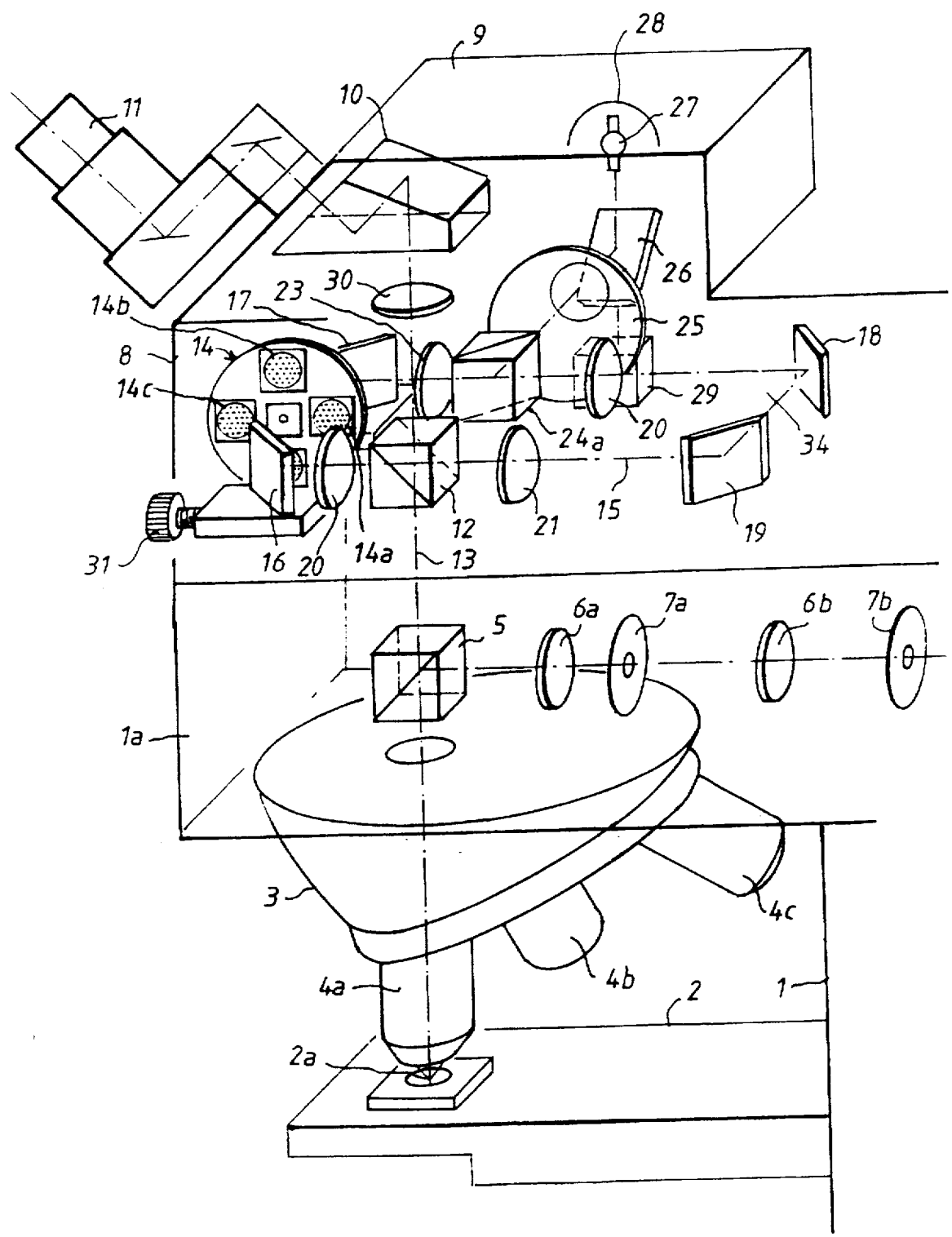
FIG. 1 shows a partially perspective section through a confocal microscope according to the invention, in which the diaphragm disc is arranged in an intermediate tube.

In an advantageous embodiment, the transparent regions are arranged at the vertices of an equilateral triangular grid. There thus results a maximum density of the transparent regions at a predetermined spacing.

Since the diaphragm disc, as already mentioned herein above, only needs to be slightly larger than the image field surface in the intermediate image, several diaphragm discs with different diameters and/or spacing of the transparent regions can be arranged in a diaphragm changer. The respective optimum parameters of the diaphragm disc for confocal observation as stated in U.S. Pat. No. 3,926,500 which are the spacing of the transparent regions and the diameter of the transparent regions can thus also be set for different microscope objectives. It is then also possible to couple the diaphragm changer to the revolving nosepiece so that the diaphragm changer is automatically changed over accompanying a change of objective, or the optimum diaphragm for an inserted objective is selected by means of a computer.

On the other hand, it is however also possible, especially in the case of fluorescence observations, to select a suitable diaphragm disc in dependence on the intensity of the fluorescent light. The spatial filtering achieved by the confocal diaphragm is in fact reduced at too great a diameter of the transparent regions, but sufficient light for visual observation is then available behind the diaphragm disc.

When several diaphragm discs are arranged in a diaphragm changer, the diaphragm discs are to be movably received in the diaphragm changer. In this case, it is possible for the diaphragm changer to bring by a rotating movement the respective diaphragm disc which is to be inserted into the beam path close to the electromechanical converters, so that only one pair of electromechanical converters needs to be provided. Such a diaphragm changer can be constructed, for example, as a rotary diaphragm carrier or as a diaphragm magazine, analogous to a magazine for photographic transparencies.

According to another aspect, the invention furthermore includes an intermediate device or tube for a microscope, designed to be installed on the portion of the stand carrying the revolving nosepiece, between this portion and the eyepiece tube of the microscope. This intermediate tube contains at least one movable diaphragm disc which has many transparent and opaque regions, for example a so-called modified Nipkow disc such as that described in U.S. Pat. No. 3,926,500, which was mentioned herein above. This diaphragm disc is arranged in a plane conjugate to the focal plane of the microscope objective, when the intermediate tube is installed on the microscope. Moreover, a reflector is provided between the diaphragm disc and the eyepiece, to reflect in additional illumination. This reflector is a component of the intermediate tube and arranged between the diaphragm disc and the eyepiece tube.

Due to the insertion of the intermediate tube between the stand part which carries the revolving nosepiece and eyepiece tube, the working space between the objectives screwed into the revolving nosepiece and the microscope stage is fully available without limitations, and also no modification of the microscope stand is necessary. The intermediate tube can thus be used in connection with inverse microscopes, in which the microscope stage is arranged above the revolving nosepiece and in which the maximum available space between the objective and the stage is substantially smaller than in upright microscopes.

Due to the additional illumination which can be reflected in, between the diaphragm disc and the eyepiece tube, the intermediate tube can furthermore also be used in conjunction with those conventional microscopes in which no conventional illuminator for epi or reflected light illumination is provided in the microscope stand.

In an advantageous embodiment of the intermediate device or tube, the reflector for reflecting in the additional illumination is a dichroic beam splitter. This can be received, in particular, in a reflector slide or a reflector turret. This dichroic beam splitter is particularly advantageous for confocal fluorescence microscopy, in which the visually observable fluorescence light deviates in its wavelength from the illuminating light reflected in via the beam splitter. By means of several dichroic beam splitters received in the reflector slide or reflector turret, and mutually differing in their spectral transmission and reflection characteristics, observation is then possible at different fluorescence wavelengths. Further, it is advantageous if the additional illuminator has an elliptical reflector and the light source, preferably a mercury vapor lamp, is arranged at one focus of the elliptical reflector. A considerably greater fraction of the light emitted by the light source is thereby used for object illumination.

The intermediate tube can in particular be constructed for application in a telecentric beam path. It then has a first additional optics for the production of an intermediate image in the plane of the diaphragm disc and a second optics for again producing a telecentric beam path between the plane of the diaphragm disc and the eyepiece tube.

The beam path entering the intermediate tube and the beam path leaving the intermediate tube preferably have identical beam cross sections. The intermediate tube can then be simply used between the stand and the eyepiece tube, while retaining the eyepiece tube which is already present, in microscopes of modular construction which have the eyepiece tube, or the reflection out into the eyepiece tube, arranged in a module which is separable from the stand.

In a further advantageous embodiment of the intermediate tube, the diaphragm disc can be switched into and out of the beam path, in that the diaphragm disc together with its drive is pivoted out of the beam path. A rapid and simple changeover between conventional and confocal observation is then possible. Here, the optics which produces the intermediate image and the optics that further images the intermediate image to infinity are fixedly arranged in the intermediate tube, so that the intermediate tube has an overall simple construction.

In a particularly advantageous embodiment, the beam path within the intermediate tube is conducted in a plane which is perpendicular to the entering and leaving beam path, and is reflected at the same reflector in the intermediate tube, into or out of the latter. As a result, when the intermediate tube is installed there is only a slight raising of the eyepiece tube in comparison with the arrangement without an intermediate tube, so that the overall arrangement is also satisfactory from the ergonomic viewpoint.

Figure 3:
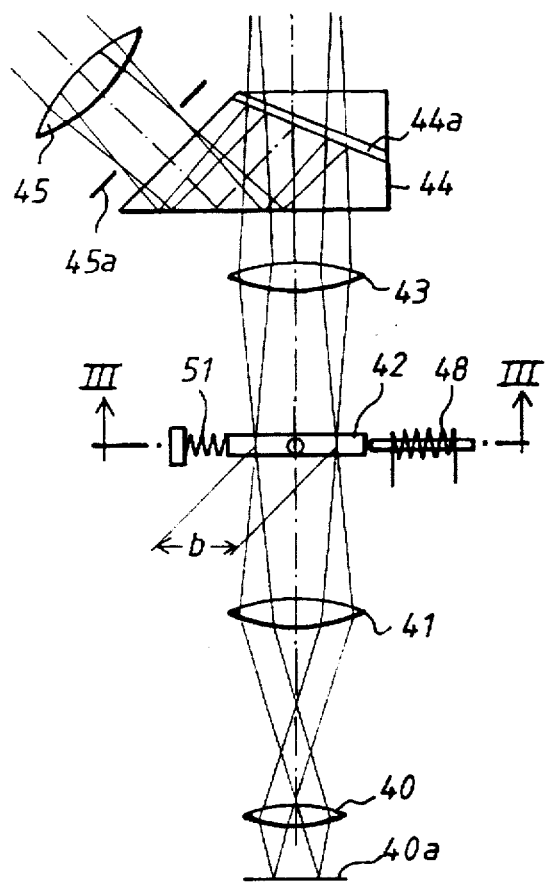
FIG. 3 shows a schematic of the beam path with a confocal diaphragm according to the invention.

The principal beam path of a confocal microscope according to the invention is shown in FIG. 3. By means of an objective (40) corrected to infinity focal intercept, with an associated tube lens (41), the focal plane (40a) of the objective (40) is imaged in the plane of the diaphragm disc (42). The diaphragm disc (42) is formed here as a thin, opaque metal foil, and is shown in FIG. 3 with an exaggerated thickness. The image field diameter in the plane of the diaphragm disc (42) is denoted by b.

Figure 4:
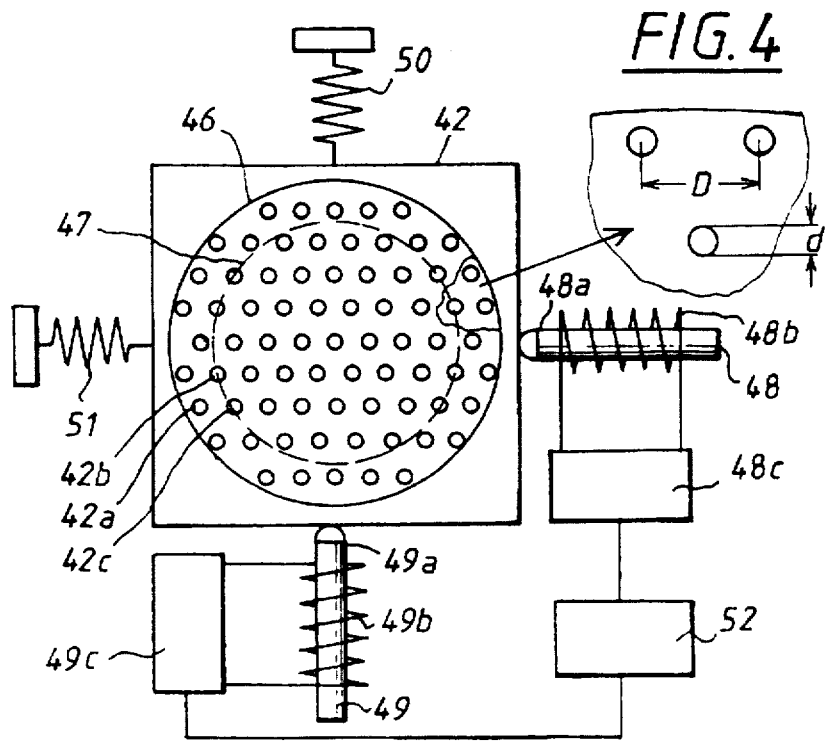
FIG. 4 shows a section along the plane III—III in the schematic of FIG. 3.

As can be gathered from FIG. 4, which is a sectional representation perpendicular to FIG. 3, the diaphragm disc (42) has, in a circular region (46), transparent regions formed as holes (42a–c) passing through the diaphragm disc. The holes (42a–c) are here arranged on an equilateral triangular grid. That is, the midpoints of three respective adjacent holes respectively form equilateral triangles, and all the holes (42a–c) in common form a regular two-dimensional grid within the region (46). The region (46) of the diaphragm disc (42) which has the holes is here a maximum of 20% greater in surface area than the image field (47) shown dashed in the plane of the diaphragm disc. As can be furthermore gathered from the enlarged detail in FIG. 4, each of the holes (42a–c) has a diameter d and respective adjacent holes have a distance of D between their midpoints.

The diaphragm disc (42) is movably mounted in the image plane. For this purpose, the diaphragm disc is received on a respective spring (50, 51) on each of two mutually perpendicular sides. For movement of the diaphragm disc, a respective electromagnetic drive (48, 49) is provided on each respective side opposite a spring. The electromagnetic drives (48, 49) here like the electromagnets of commercial headphones, are respectively constructed from a core (48a, 49a) of magnetic soft iron and a coil (48b, 49b) surrounding the core (48a, 49a). A two-channel noise generator is provided in order to produce exciting currents for the coils (48b, 49b). This can, for example, be embodied as a stereo radio receiver (52) which is designed for the reception of frequency modulated electromagnetic waves and the antenna of which is short circuited by a matched impedence. Because of the matched impedence of the antenna input, the stereo receiver produces a wide-band noise signal in the frequency region of 20 Hz–15 kHz. The output signals of both stereo channels here deviate strongly from one another. A final stage amplifier (48c, 49c) is connected to each of the two stereo outputs of the radio receiver (52), and provides the exciting current for the respective one of the coils (48b, 49b) connected to the final stage amplifier. The components required for the drive of the diaphragm disc (42) are in this manner embodied by inexpensive mass-produced items.

By the excitation of the two electromagnetic transducers (48, 49) by two different wide-band noise signals, the diaphragm disc (42) executes a two-dimensional stochastic motion. Each hole (42a–c) then describes a random path around an intermediate position defined by the mechanical arrangement. The appearance of superimposed structures such as scanning patterns is prevented by this random path. Since the reversal points of the paths are also random, there also arises no irregularity in the brightness distribution in the image field.

An intermediate image and the diaphragm disc are thus moved stochastically relative to each other in the intermediate image plane. The occurrence of visible structures, such as stripes that are superimposed on the image is excluded by the stochastic motion. Moreover, the fluctuation of the frequency and amplitude of motion prevent the transmission of mechanical vibrations to the stand. When the observer blinks, only the appearance of a granular structure is to be expected in the least favorable case because the diaphragm disc executes no ordered motion over large path lengths.

The stochastic motion between the diaphragm disc and the intermediate image preferably takes place in two orthogonal directions in the plane of the intermediate image, and the motion in each of the two directions takes place by stochastic amounts. The total surface of the diaphragm disc can then be appreciably smaller than four times the image field surface in the intermediate image. Thus, the mass of the diaphragm disc is to be moved, and the excursion of movement of the diaphragm disc can also be small so that transmission of mechanical vibrations to the stand is again prevented. Because the surface of the diaphragm disc having the transparent regions needs only, according to the hole spacing, to be about 1–20% greater than the image field surface in the plane of the diaphragm disc, and consequently, the number of the transparent regions is small in comparison to the number of holes in the case of a modified Nipkow disc, the transparent regions can be constructed as holes in an opaque carrier, e.g., holes bored with a laser beam through a metal foil. For example, defects of the image in the intermediate plane due to dirt or surface reflections in the transparent regions can thereby be avoided.

To produce the relative motion, electromechanical transducers driven by low frequency noise signal generators can be provided. The noise signal generators then produce electrical signals of different amplitudes in the frequency region from 0 Hz up to 1 MHz. The noise signal generators can however also be conventional short wave and ultrashort wave receivers, known from radio technology with associated amplifiers to produce a frequency modulated noise signal in the acoustic frequency region (20 Hz–20 kHz). The electromechanical transducers can be constructed as electromagnets, for example, from headphone loud speakers or as piezo converters or the like.

The frequency regions and the band width of the noise are selected such that the diaphragm disc can follow the noise sufficiently rapidly and that the noise has a band width that is sufficiently wide to ensure that no clearly preferred frequency of the diaphragm motion occurs.

As can be further gathered from FIG. 3, the light transmitted through the holes (42a–c) of the diaphragm disc (42) is imaged a further time, by means of the lens (43) and the deflecting prism (44), in the intermediate image plane (45a), in which it is virtually observable through an eyepiece (45). The illumination beam path required for confocal observation is reflected into the observation beam path, for example at a partially reflecting or dichroic intermediate surface (44a) of the prism (44), between the intermediate image (45a) produced by the lens (43) and the diaphragm disc (42).

Reselecting in at a dichroic beam splitter face is here in particular preferred for the observation of confocal fluorescence images, and reflecting in at a partially reflecting face is preferred for the observation of confocal epi illumination images.

The upright microscope shown in detail in FIG. 1 has a stand (1), of which only the upper portion of the stand is shown. The microscope stage (2) is height-adjustable on the vertical column of the stand. That is, it is arranged to be displaceable in the direction of the optical axis (13). Moreover, a stand arm, which extends in a substantially horizontal direction, is provided on the vertical column of the stand, with the revolving nosepiece (3) received on its side facing the stage (2) with several objectives (4a–c). Only three objectives are shown here for clarity, although the revolving nosepiece can be constructed to receive 5, 6 or 7 objectives.

The optics is also contained in the stand arm (1a) for a conventional epi illuminating beam path, which is deflected by the illuminator reflector (5) from the horizontal into the direction of the optical axis (13) of the microscope. Of the vertical illuminating system, only two lenses (6a, 6b), the adjustable aperture stop (7a), and the adjustable illumination field stop (7b) for the setting of Köhler illumination conditions are shown in FIG. 1.

An intermediate tube (8) is arranged between the horizontal stand arm (1a) and the eyepiece tube (9) with its tube lens (30), the deflecting prism (10) and the eyepiece (11). The diaphragm discs (14a–c) are an essential component of this intermediate tube (8), and are received in a diaphragm changer (14). A respective one of the diaphragm discs (14a–c), according to the changeover position of the diaphragm changer (14), is located in a plane which is conjugate to the focal plane (2a) of the objectives (4a–c). Reference is made to the description herein below of FIGS. 5 and 6 for more details of the diaphragm discs (14a–c), and to FIG. 4 and the description herein above, for the movement of the diaphragm discs (14a–c). A further essential component of the intermediate tube (8) is the additional illumination (27) which can be coupled in by means of a dichroic beam splitter (24a) into the portion of the beam path which is in common for illumination and observation.

Figure 2:
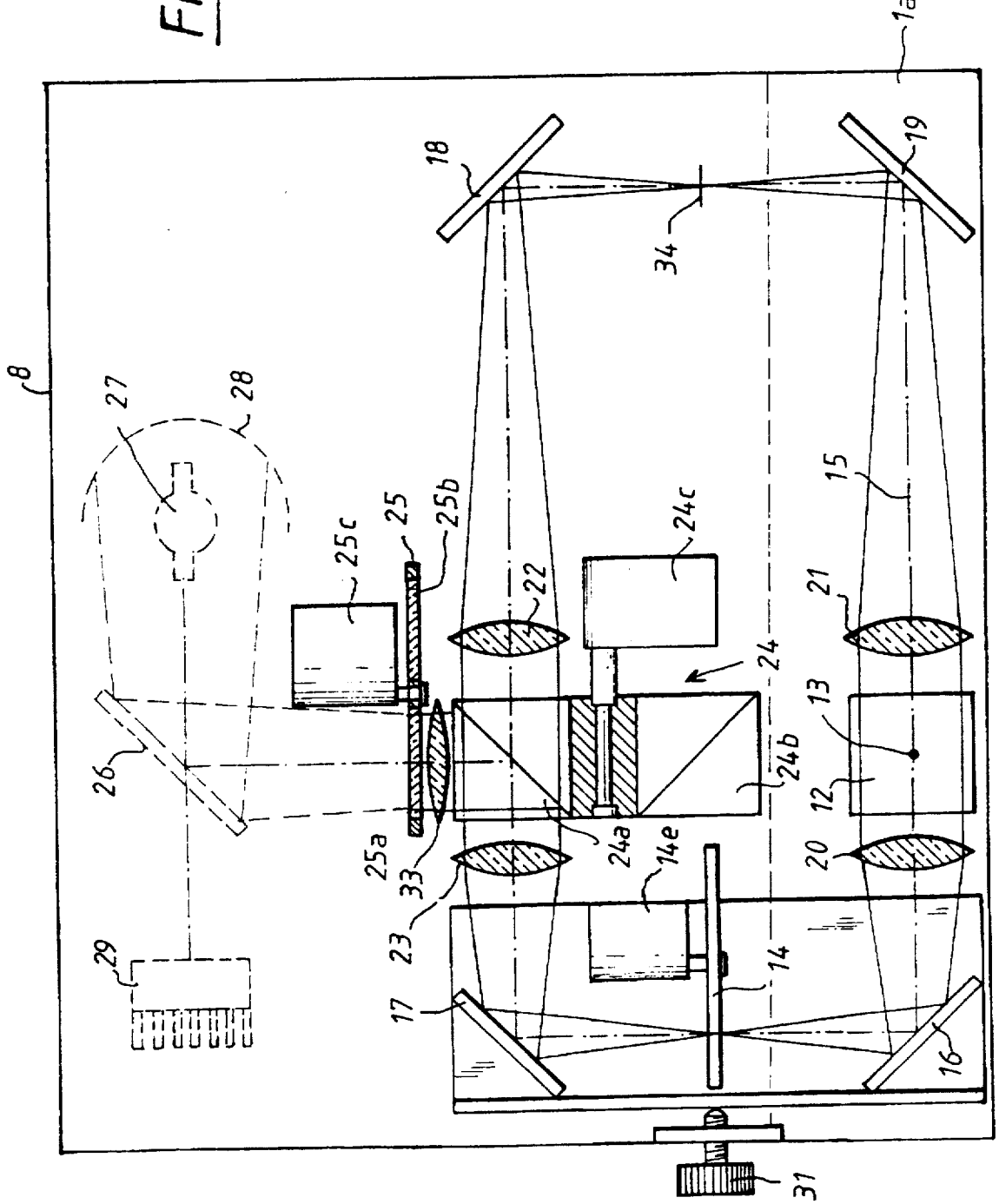
FIG. 2 shows a section, perpendicular to FIG. 1, in a plane containing the optical axis in the intermediate tube.

The overall arrangement of the components within the intermediate tube (8) can be distinguished and surveyed most easily by reference to FIG. 2. The light emitted by the light source (27) and collected by the elliptical mirror (28) is first decomposed there by a metal oxide vaporized mirror (26) into the visible and the infrared spectral portions. The infrared spectral portions pass through the metal oxide vaporized mirror (26) and are absorbed in a subsequent infrared absorber (29). For thermal reasons, the illuminating beam path between the light source (27) and the infrared absorber runs in a vertical direction, but for clarity of arrangement is shown in FIG. 2 as rotated through 90 degrees.

The visible spectral fractions which are reflected at the metal oxide vaporized mirror (26) then pass through a filter wheel (25) fitted with different color filters which are not shown in detail. The filter wheel (25) can be rotated by a stepping motor (25c) so that different color filters can be selectively pivoted into the beam path so that the wavelength of the exciting light is variable. The light transmitted by the filter wheel is then reflected by the dichroic beam splitter prism (24) into the telecentric region of the common beam path for illumination and observation within the intermediate tube (8). The dichroic beam splitter prism (24a) can here be arranged in a prism turret which is rotatable by means of a further stepping motor (24c), and on which are mounted several dichroic beam splitters, so that different wavelengths for illumination and observation can be set by the pivoting in of different dichroic beam splitters and by different settings of the filter wheel (25).

The illuminating light reflected in at the dichroic beam splitter (24a) is focused by the lens (23) via the mirror (17) onto the diaphragm disc (14a) which has been pivoted into the beam path. This focus, after a further deflection by a further mirror (16), is defocused to infinity by a further lens (20) and is deflected vertically downwards in the direction of the objective (4a) by the mirror prism (12). The mirror prism (12) is here constructed as a cube and has a fully reflecting diagonal surface. The objective (4a) corrected to infinity focal intercept focuses the illumination light in the focal plane (2a) which is located in or on the sample. The light coming from the sample, fluorescence light for example, is then collected again and imaged to infinity by the objective (4a), deflected by the mirror prism (12) in the direction of the diaphragm disc (14a), and focused on the diaphragm disc (14a) by the lens (20). The diaphragm disc (14a) is correspondingly arranged in a plane which is conjugate to the focal plane (2a).

The light spatially filtered by the diaphragm disc (14a), after a further deflection by the mirror (17), is then imaged to infinity by the lens (23). Since the fluorescent light has a wavelength different from that of the illuminating light, the dichroic beam splitter (24a) transmits it. A subsequent lens (22) produces, via a further deflecting mirror (18), a further intermediate image (34) of the object. This intermediate image (34), after a further deflection at the mirror (19), is again imaged to infinity by the lens (21) and is deflected upwards by the fully reflecting surface of the mirror prism (12), in the direction of the eyepiece tube (9). The tube lens (30) of the eyepiece tube produces, after a deflection at the deflecting prism (10), a further intermediate image of the object in the focal plane of the eyepiece (11), where this image can be visually observed by means of the eyepiece (11).

Within the intermediate tube (8), with the exception of the portion between the light source (27) and the dichroic beam splitter (24a), the beam path runs in a closed loop, the axis of which is situated perpendicular to the optical axis (13) of the microscope. Therefore, the interposition of the intermediate tube (8) has only slight disadvantages in terms of the ergonomics of the microscope.

For the confocal manner of operation of the microscope with the intermediate tube (8), it is necessary that the diaphragm discs (14a–c) be arranged precisely in a plane which is conjugate to the focal plane (2a) of the objective (4a). In order to be able to always reset this confocality condition precisely, the two mirrors (16, 17) adjacent to the diaphragm changer (14) are arranged on a table which is linearly displaceable together with the diaphragm changer (14) so that the optical path length between the lenses (20) or (23) and the diaphragm changer (14) and the diaphragm discs (14a–c) contained in it can be varied by means of an adjusting screw (31).

So that a conventional image can be observed even with the intermediate tube (8) installed, the diaphragm changer (14) is pivotable, together with the drive motor (14e), about an axis lying in the plane of the drawing of FIG. 2, and can thus be pivoted out of the beam path.

Figure 5:
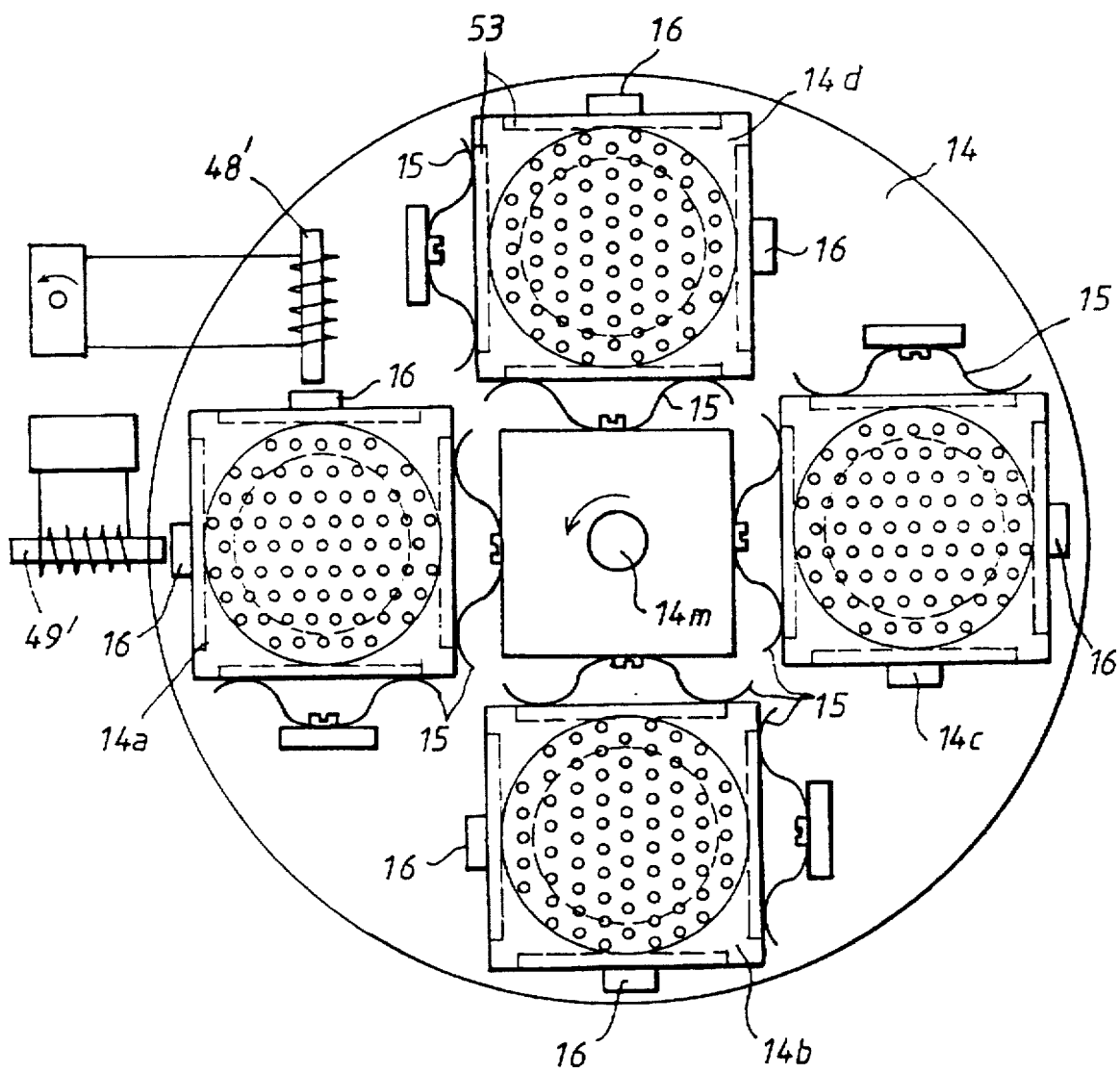
FIG. 5 shows an enlarged illustration of the diaphragm changer of FIG. 1.
Figure 6:
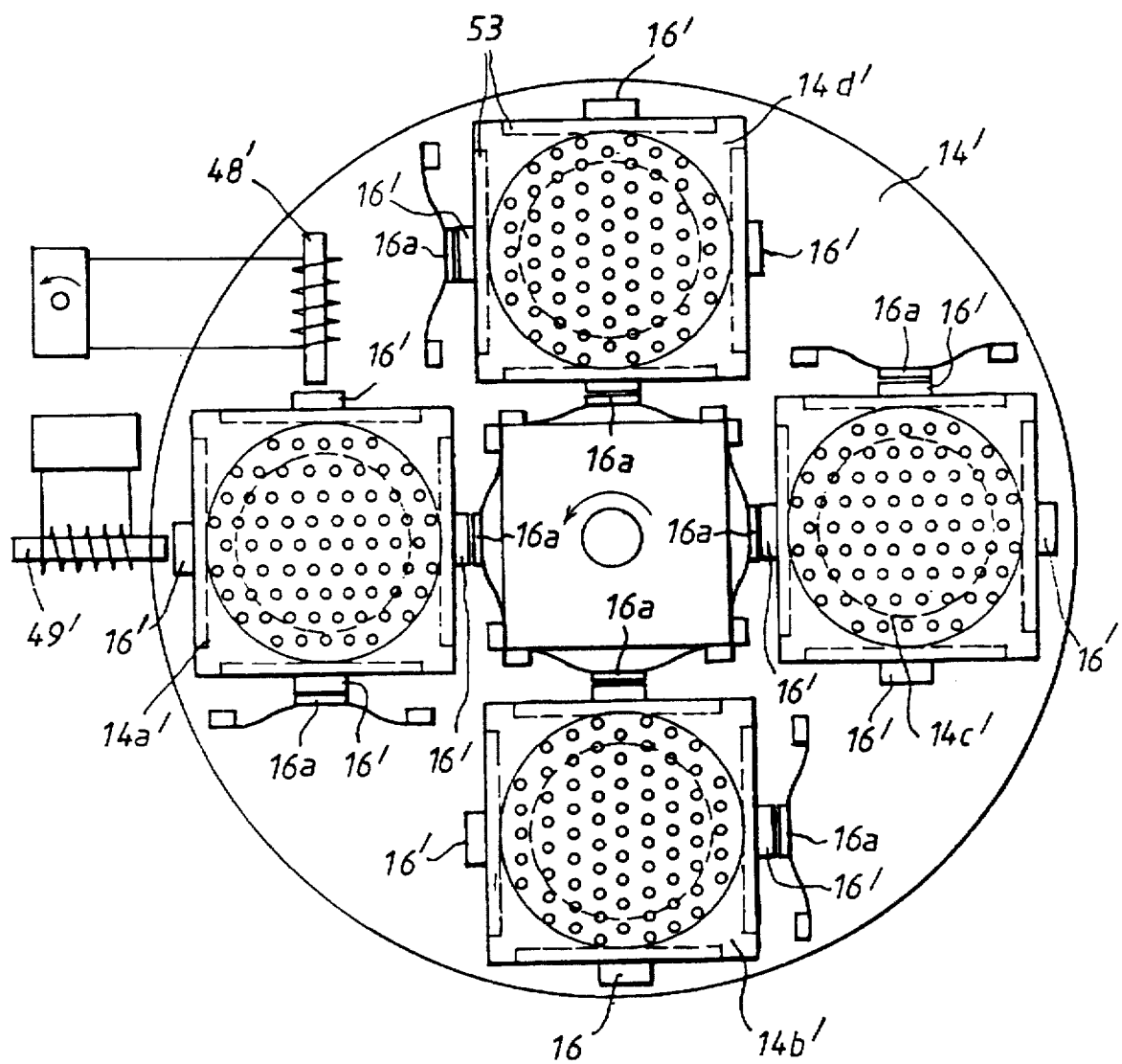
FIG. 6 shows an alternative embodiment of a diaphragm changer.

The diaphragm changer (14) with the four diaphragm discs (14a–d) received in it is shown in detail in FIG. 5. Each of the diaphragm discs (14a–d) substantially corresponds to the diaphragm disc (42) of FIG. 4. The different diaphragm discs (14a–d) have different hole diameters (d) and a different hole spacing (D) corresponding to the different objectives (4a–c) in the revolving nosepiece. The hole diameters (d) have values between 5 and 100 μm, and the hole spacings have values between 20 and 1,000 μm. Since in any case the hole diameters and hole spacing cannot be shown to scale, a representation of different diameters and spacing has been dispensed with. It is then optionally possible, by changing over to different combinations of the diaphragm discs (14a–d) and the objectives (4a–c), selectively to vary the optimum confocal filtering, or (by selection of a diaphragm with hole diameters which are too large) to vary the intensity of the observation light, while reducing the spatial filtering effected by the confocal diaphragm.

The individual diaphragm discs (14a–d) are respectively resiliently received in the diaphragm changer (14) by thin leaf springs (15). To prevent falling out of the diaphragm discs (14a–d) when the diaphragm changer is arranged vertically, securing means (not shown), for example in the form of small pins, can be provided on the free sides of the diaphragm discs, opposite the spring-loaded sides.

Each of the diaphragm discs (14a–d) is provided on its two free sides with an adapter of ferromagnetic material. The adapters (16) are here designed to cooperate with the electromagnetic transducers (48', 49') in the neighborhood of the intermediate image in a manner such that only the diaphragm disc (14a) which has been switched into the beam path can be moved by the electromagnetic transducers (48', 49').

Changing over of the diaphragm discs takes place by rotating the diaphragm changer (14) about its midpoint (14m). To prevent a collision between the diaphragm discs (14a–d) while changing over the diaphragm, at least the electromagnetic transducer (48') projecting further into the diaphragm changer (14) is then pivoted back again. This pivoting is indicated on the transducer (48') by an arrow. To prevent components of motion in the direction of the optical axis, each of the diaphragm discs (14a–d) is guided in the intermediate image plane by guide paths (53), shown dashed, which lie above and below the plane of the drawing and engage the edges of the diaphragms.

As an alternative to spring loading of the diaphragm discs (14a–d), these can also be held by means of small, spring-loaded permanent magnets (16a) (FIG. 6) on the diaphragm changer (14'). The diaphragm discs (14a'–d') are then provided on all four edges with respective projections (16') of low-retentivity magnetic material. Additional securing means against falling of the diaphragm discs out of the diaphragm changer are then not necessary. The diaphragm changer of FIG. 6 corresponds in other respects to that of FIG. 5, so that the description herein above may be referred to for further details.

Figure 7:
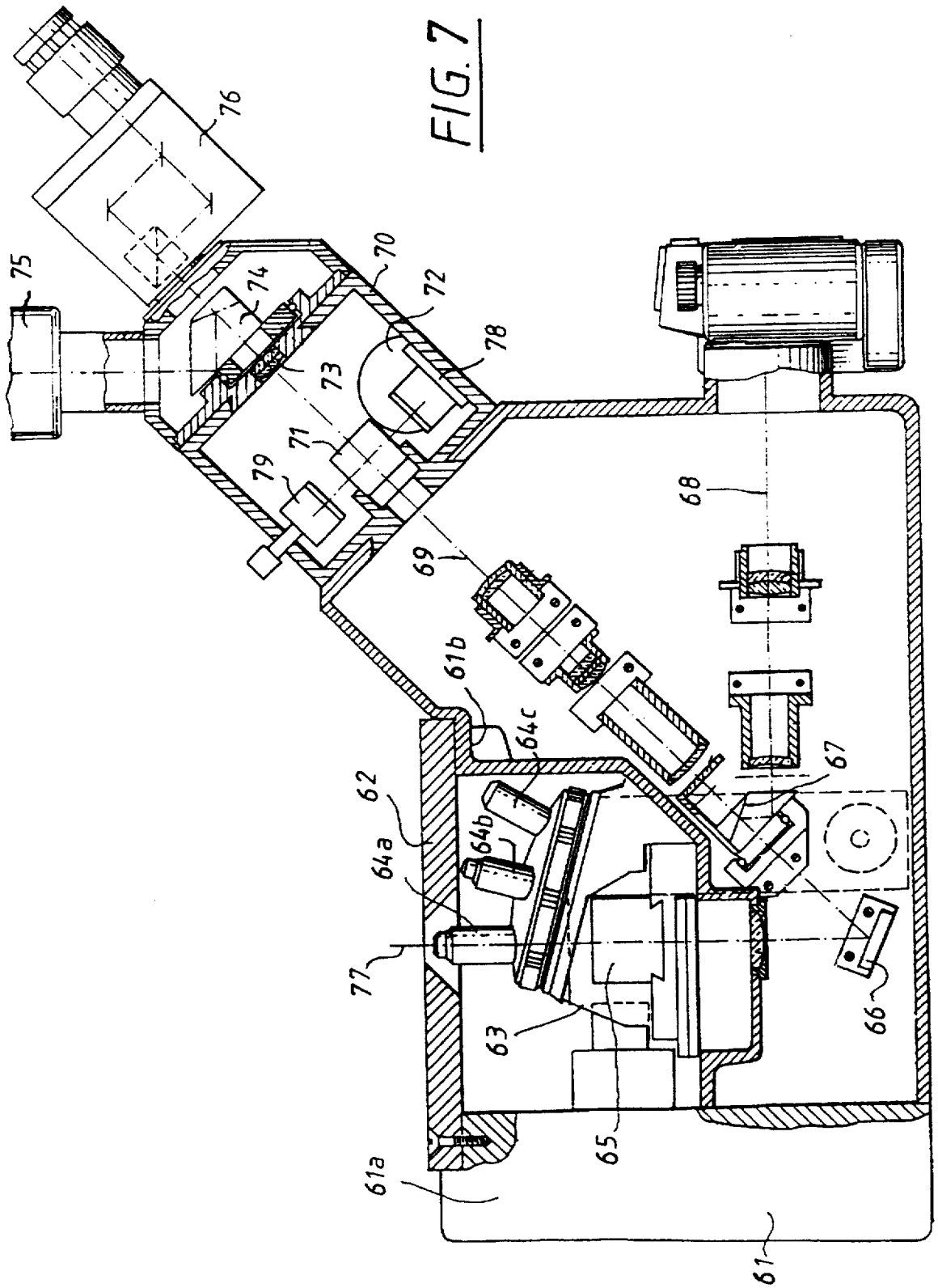
FIG. 7 shows a section, in a plane containing the optical axis, of an inverted microscope with an intermediate device or tube installed between the microscope stand and the eyepiece tube.

In the embodiment shown in FIG. 7, the intermediate device or tube (70), which corresponds in construction to the intermediate tube (8) of FIGS. 1 and 2, is arranged between the stand (61) and the eyepiece tube (76) of an inverted microscope. The stand (61) substantially has a U-shape, and the microscope stage is fixed to the two U-shanks (61a, 61b). The revolving nosepiece (63) with the objectives (64a, 64b, 64c) is arranged between the stand (61) and the stage (62). The revolving nosepiece (63) is height-adjustable for focusing. That is, it is displaceable along the optical axis. Conventional vertical illumination, which is not shown in detail in FIG. 7, can be reflected into the beam path along the optical axis (77) by an epi illumination reflector (65). The beam path within the stand (61), seen from the objective (64a), at first runs downwards and, after reflection at a mirror (66), diagonally upwards in the direction of the eyepiece tube (76) along a diagonal optical axis (69). A further beam splitter prism (67) is arranged, on a prism slide, in the beam path which runs diagonally upwards, and a portion of the observation beam path can be reflected out by double reflection at this prism (67) into the photo beam path (68), which runs horizontally.

So far, the inverted microscope corresponds to the Applicants' assignee's, known "Axiovert". This is described in U.S. Pat. No. 5,138,486 and U.S. Pat. No. 5,235,459. These documents should therefore be consulted regarding the details of the optics within the stand (61).

Also, the observation beam path (69) in this stand is telecentric in the region of the interface for the binocular tube (76). Therefore, the intermediate tube (70), which has already been described in detail with reference to FIGS. 1 and 2, can also be installed on this stand. For clarity, only the reflector prism (71), the diaphragm changer (72), and two mirrors (78, 79) are shown here. They correspond to the diaphragm changer (14) with the diaphragm discs and the mirrors (16, 19) of FIGS. 1 and 2. In addition to the tube lens (73), which here also produces in the eyepiece a real intermediate image of the focal plane of the objective (64a), the binocular tube (76) has a beam splitter prism (74) by means of which a portion of the observation light can be reflected out into the camera outlet (75), which runs vertically.

Also in this embodiment, a confocal object image is visually observable on looking into the eyepiece tube (76), and by the reflection out into the camera outlet (75), when a video camera is connected, a confocal sample image can be displayed on a monitor and/or recorded with a video recorder (not shown). At the same time, this embodiment makes it possible, by connection of a further video camera to the horizontal photo outlet (68) to display and/or record a conventional microscope image. The conventional and the confocal images differ in a known manner, in that the confocal images contains only image information from a thin sample section perpendicular to the optical axis (77) of the objective (64a–c), due to the filtering by the diaphragm disc. The conventional image contains information from different object depths and hence, can be of use, particularly for orientation within the sample. In order to equalize the difference in brightness between the conventional and confocal images, a filter (not shown) is provided for light attenuation at the horizontal photo outlet.

I claim:

1. An intermediate device for attachment to a stand of a microscope having a first telecentric beam path (4a, 30), said intermediate device comprising:

optics (12, 20, 16, 17, 23, 22, 18, 19, 21) that define a beam path within said intermediate device coupled to said first telecentric beam path, and a movable diaphragm disc (14) having a plurality of transparent regions arranged in a plane perpendicular to said beam path within said intermediate disc, wherein, said optics comprise a first lens (20) for generating an intermediate image in said plane of said diaphragm disc (14) from said first telecentric beam path coming from an objective (4a) of said microscope and a second lens (23) for generating a second telecentric beam path of light transmitted through said diaphragm disc (14) and leading to an ocular tube (11).

2. The intermediate device according to claim 1, further comprising a gas discharge tube (27) and an elliptical mirror (28) for providing illumination.

3. The intermediate device according to claim 1, further comprising a first reflector (24a) arranged within said second telecentric beam path, said first reflector (24a) deflecting an illuminating beam path directionally toward said diaphragm disc (14).

4. The intermediate device according to claim 3, wherein said first reflector (24a) comprises a dichroic beam splitter.

5. The intermediate device according to claim 3, further comprising a reflector turret (24), wherein said first reflector (24a) and at least one additional reflector (24b) are arranged on said reflector turret (24).

6. The intermediate device according to claim 1, wherein said first telecentric beam path has a cross section that is the same as the cross section of said second telecentric beam path.

7. The intermediate device according to claim 1, further comprising a third lens (22) and a fourth lens (21) arranged in said beam path of said intermediate device downstream of said second lens (23), said third lens (22) producing an intermediate image of light transmitted through said diaphragm disc (14), and said fourth lens (21) being arranged downstream of said intermediate image and producing said second telecentric beam path.

8. The intermediate device according to claim 7, wherein said first, second, third and fourth lenses are fixedly arranged in said intermediate device.

9. The intermediate device according to claim 1, wherein said beam path within said intermediate device is perpendicular to said first telecentric beam path, further comprising a reflector (12) within said intermediate device by which light emitted by an object is reflected into said perpendicular beam path and by which light having transmitted through said diaphragm disc (14) is deflected into said ocular tube (11).

10. The intermediate device according to claim 9, wherein said optics comprises two mirrors (16, 17) arranged in said beam path of said intermediate device and displaceable parallel to each other.

11. An intermediate device according to claim 1, further comprising a mover that moves said diaphragm disc perpendicularly to said beam path within said intermediate device by stochastic amplitudes.

12. A microscope comprising:
a stand (1),
a revolving nose piece (3) attached to said stand for receiving objective lenses (4a, 4b, 4c) for imaging an object along a telecentric beam path,
an intermediate device (8) attached to said stand (1),
an ocular tube (11) attached to said intermediate device (8),
said intermediate device comprising:
optics (12, 20, 16, 17, 23, 22, 18, 19, 21) defining a beam path within said intermediate device (8) coupled to said telecentric beam path,
a movable diaphragm disc (14) having a plurality of transparent regions (42a, 42b, 42c), said diaphragm disc (14) being arranged in a plane perpendicular to said beam path within said intermediate device,
whereby said optics comprise a first lens (20) for producing an image of said object in said plane of said diaphragm disc (14) and a second lens (23) for generating a telecentric beam path of light transmitted through said diaphragm disc (14) and leading to said ocular tube (11).

13. The intermediate device according to claim 12, wherein said ocular tube (11) includes an interface for connecting a camera.

14. The microscope according to claim 12, further comprising a first reflector (24a) arranged within said second telecentric beam path, said first reflector (24a) deflecting an illuminating beam path directionally toward said diaphragm disc (14).

15. The microscope according to claim 14, wherein said first reflector (24a) comprises a dichroic beam splitter.

16. The microscope according to claim 14, further comprising a reflector turret (24), wherein said first reflector (24a) and at least one additional reflector (24b) are arranged on said reflector turret (24).

17. The intermediate device according to claim 12, wherein said first telecentric beam path has a cross section that is the same as the cross section of said second telecentric beam path.

18. The microscope according to claim 12, further comprising a third lens (22) and a fourth lens (21) arranged in said beam path of said intermediate device downstream of said second lens (23), said third lens (22) producing an intermediate image of light transmitted through said diaphragm disc (14), and said fourth lens (21) being arranged downstream of said intermediate image and producing said second telecentric beam path.

19. The microscope according to claim 18, wherein said first (20), second (23), third (22), and fourth (21) lenses are fixedly arranged in said intermediate device.

20. The microscope according to claim 18, wherein said optics comprises two mirrors (16, 17) arranged in said beam path of said intermediate device and displaceable parallel to each other.

21. The microscope according to claim 12, wherein said beam path within said intermediate device is perpendicular to said first telecentric beam path, and a reflector (12) is provided within said intermediate device by which light emitted by an object is reflected into said perpendicular beam path and by which light having transmitted through said diaphragm disc (14) is deflected into said ocular tube (11).

22. The microscope according to claim 12, further comprising a gas discharge lamp (27) and an elliptical mirror (28) for providing illumination.

23. A microscope according to claim 12, further comprising a mover that moves said diaphragm disc perpendiculary to said beam path within said intermediate device by stochastic amplitudes.

* * * * *